US 6,560,082 B1

(12) United States Patent
Arisawa

(10) Patent No.: US 6,560,082 B1
(45) Date of Patent: May 6, 2003

(54) POWER SOURCE UNIT AND CARD-LIKE MEMORY MEDIUM

(75) Inventor: Shigeru Arisawa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/453,330

(22) Filed: Dec. 2, 1999

(30) Foreign Application Priority Data

Dec. 10, 1998 (JP) .............................. 10-351747

(51) Int. Cl.[7] .................................................. H02H 3/00
(52) U.S. Cl. ........................ 361/84; 361/82; 361/115
(58) Field of Search .......................... 361/82, 84, 115, 361/90, 18, 58

(56) References Cited

U.S. PATENT DOCUMENTS 6,193,164 B1 * 2/2001 Arisawa ..................... 235/487

OTHER PUBLICATIONS

U.S. application Ser. No. 08/872,619 filed Jun. 10, 1997.
U.S. application Ser. No. 09/243,671 filed Feb. 2, 1999.
U.S. application Ser. No. 09/244,010 filed Feb. 4, 1999.

* cited by examiner

Primary Examiner—Stephen W. Jackson
(74) Attorney, Agent, or Firm—Bell, Boyd & Lloyd LLC

(57) ABSTRACT

A power source unit can be miniaturized with increases in power consumption suppressed. A rectifier means (201) is used to prevent a direct current supplied via a second input terminal (VDD or VSS) from being supplied reversely to a first input terminal (CP or CM) and thereby to eliminate the conventional necessity to a separate dispose means for preventing the direct current supplied via the second input terminal from being supplied reversely to the first input terminal, thereby permitting simplifying a configuration and reducing useless power consumption, and thereby miniaturizing the unit with increases in power consumption suppressed.

15 Claims, 10 Drawing Sheets

POWER SOURCE UNIT AND CARD-LIKE MEMORY MEDIUM

BACKGROUND OF THE INVENTION

1. Field of the Invention

The present invention relates to a power source unit and a card-like memory medium, and more particularly, is suitably applied to integrated circuit (IC) cards which are to be used, for example, in a security system.

2. Description of the Related Art

There are security systems in which IC cards are given to users and each person is identified with his IC card. Such security systems uses a reader/writer which exchanges data with an IC card, to identify users by reading/writing the data from/into their IC cards.

As the security systems, there have been proposed and adopted a contact type system which exchanges data between an IC card and a reader/writer by electrically connecting to each other and a non-contact type system which exchanges data between an IC card and a reader/writer via electromagnetic waves.

In the non-contact type security system, a reader/writer first modulates data to be transmitted by a predetermined method and radiates electromagnetic waves (magnetic field) corresponding to the obtained transmission data to an IC card. The IC card receives the electromagnetic waves radiated from the reader/writer and demodulates it by a predetermined method, thereby restoring original data. The IC card generates a response signal by performing predetermined data processing on the restored original data.

The IC card modulates this response signal by a predetermined method and transmits electromagnetic waves corresponding to the obtained transmission data to the reader/writer. The reader/writer receives the electromagnetic waves transmitted from the IC card, restores an original response signal by demodulating the electromagnetic waves and operates in accordance with the response signal. By the way, an IC card which is now used is configured to operate internal circuits by utilizing a magnetic field energy of the received electromagnetic waves without using a battery.

In the contact type security system, on the other hand, the reader/writer is configured to first trigger the IC card via a connection point between the reader/writer and the IC card so that data is transmitted and received between them by the trigger.

Under the present circumstance which is a transition period where the security system is shifting to the non-contact type from the contact type, there is an increasing demand for a system which has functions of both the non-contact type and the contact type, whereby a composite IC card which has functions of both the non-contact type and the contact type has been proposed. A configuration of this composite IC card will be described below with reference to FIG. 1.

In the following description, a mode where a composite IC card 1 operates as a non-contact type and another mode where it operates as a contact type will be referred to as a remote mode and a contact mode, respectively. In the remote mode, the composite IC card 1 receives electromagnetic waves transmitted from a reader/writer (not shown) with an antenna coil 2, and sends out the energy of the electromagnetic waves to a power unit 3, a remote side data input/output unit 4, a voltage detector 5 and a carrier extraction circuit 6 via an antenna coil connection terminal CP or CM.

In the contact mode, on the other hand, the composite IC card 1 supplies to the power unit 3 a source voltage which is sent from the reader/writer (not shown) via a contact side power terminal VDD or a contact side ground terminal VSS.

In the remote mode, the power unit 3 converts the electromagnetic waves energy supplied via the antenna connection terminals CP or CM into a direct voltage with a rectifier 10 and sends out the direct voltage as a service voltage $V_{sup}$ to a regulator 11 and the voltage detector 5 by way of a first reverse-flow preventing diode element D1. In the contact mode, on the other hand, the power unit 3 supplies a source voltage which is sent via the contact side power terminal VDD as the service voltage $V_{sup}$ to the regulator 11 and the voltage detector 5 via a second reverse-flow preventing diode element D2.

The regulator 11 is configured to keep the level of the service voltage $V_{sup}$ constant and send it out to the voltage detector 5 and a logic circuit 12, thereby supplying a stable power to the voltage detector 5 and the logic circuit 12. The voltage detector 5 is configured to generate various kinds of flags for operating the logic circuit 12.

Concretely, the voltage detector 5 converts the level of the supplied service voltage $V_{sup}$ into a voltage level corresponding to an internal source voltage VCC, and in the case where a converted source voltage VCC has a voltage level lower than that which is required to operate the logic circuit 12, the voltage detector 5 sends out a reset signal VRST having a logical level"H" to the logic circuit 12, thereby stopping the logic circuit 12. In the case where the source voltage VCC has a voltage level higher than that which is required to operate the logic circuit 12, on the other hand, the voltage detector 5 sends out a source voltage monitor flag signal VF1 having the logical level"H" to the logic circuit 12, thereby operating the logic circuit 12. Further, when the service voltage $V_{sup}$ has a voltage level higher than a predetermined threshold level, the voltage detector 5 sends out an input voltage detection flag VZ having the logical level "H" to the logic circuit 12.

When the voltage detector 5 detects the source voltage which is supplied via the antenna connection terminal CM, it generates a remote side source voltage flag VR having the logical level "H" and sends it out to the logic circuit 12 and an operation mode determination circuit 15, and further when the voltage detector 5 detects the source voltage which is supplied via the contact side power terminal VDD, it generates a contact side source voltage flag VC having the logical level "H" and sends it out to the logic circuit 12 and the operation mode determination circuit 15.

The remote side data input/output unit 4 generates remote side input data $RR_x$ by demodulating the electromagnetic waves received by an antenna coil and sends out the data to the logic circuit 12. The logic circuit 12 generates remote side output data $RT_x$ by performing predetermined data processing on the remote side input data $RR_x$, modulates the remote side output data $RT_x$ with the remote side data input/output unit 4 and radiates electromagnetic waves corresponding to the remote side output data $RT_x$ from the antenna coil 2.

On the basis of the electromagnetic waves received by the antenna coil 2, the carrier extraction circuit 6 extracts a remote side clock signal RCLK having the same frequency as carrier waves, and sends out the clock signal RCLK to the operation mode determination circuit 15 and a clock generator 16. In the contact mode, the composite IC card 1 inputs into a level shift circuit 17 a clock signal which is input from the contact side clock input terminal CLK. The level shift circuit 17 converts a signal level of the input clock signal into a signal level corresponding to the internal source voltage VCC, and sends out the obtained contact side clock signal CCLK to the operation mode determination circuit 15 and the clock generator 16.

On the basis of the remote side source voltage flag VR and the contact side source voltage flag VC, which are supplied from the voltage detector 5, and the remote side clock signal RCLK and the contact side clock signal CCLK, the operation mode determination circuit 15 determines an operation mode for the composite IC card 1. When a determined operation mode is the remote mode, the operation mode determination circuit 15 generates an operation mode signal Mode having the logical level "H" and sends it out to the clock generator 16 or when the determined operation mode is the contact mode, the operation mode determination circuit 15 generates an operation mode signal Mode having a logical level "L" and sends it out to the clock generator 16.

On the basis of the supplied operation mode signal Mode, the clock generator 16 selects either of the remote side clock signal RCLK and the contact side clock signal CCLK and sends the selected clock signal as a master clock signal MCLK to the logic circuit 12.

In the contact mode, the composite IC card 1 inputs data which is sent from the reader/writer via a contact side data input/output terminal I/O into a contact side data input/output unit 20. The contact side data input/output unit 20 performs a predetermined processing on the supplied data and sends out the obtained contact side input data $CR_x$ to the logic circuit 12. The logic circuit 12 generates contact side output data $CT_x$ as a response signal from the contact side input data $CR_x$ and sends it out to the contact side data input/output unit 20.

The contact side data input/output unit 20 performs predetermined data processing the contact side output data $CT_x$ and outputs it to the reader/writer via the contact side data input/output terminal I/O. Furthermore, the composite IC card 1 inputs a reset signal sent from the reader/writer into a level shift circuit 21 via a contact side reset terminal RST. The level shift circuit 21 generates a contact side reset signal CRST by converting a signal level of the reset signal into a signal level corresponding to the internal source voltage VCC and supplies the reset signal CRST to the logic circuit 12.

In the power unit 3, the input side of the diode element D1 is connected to the output side of the rectifier 10, the input side of the diode element D2 is connected to the contact side power terminal VDD, and the output sides of these diode elements D1 and D2 are connected to each other so that the service voltage $V_{sup}$ is supplied to the following circuits, as described above. When such a power unit 3 is constructed, it is inevitably necessary to integrate circuits using the process of a complementary metal oxide semiconductor (CMOS) which can realize a high integration and a low cost, in order to eliminate of useless hardware. Although integrating circuits using the process of the CMOS realize the miniaturize and low cost as described above, it causes a leak current in such a power unit 3 and as a result, the electric power consumption is increased.

Now, a principle of a leak current which is caused by the CMOS process will be described. FIG. 2 shows a case where a reverse-flow preventing diode element D1 is composed of a so-called floating type diode element D1A. A diode element D2 has the same composition as the diode element D1 and will not be omitted. The floating type diode element D1A is a diode element having a structure wherein an N well is joined onto a P-type substrate adopted as ground, and an N+ layer and a P+ layer having high concentrations are joined onto the N well so that the N+ layer and the P+ layer have potentials floating from the ground.

As shown in FIG. 3, though the floating type diode element D1A is configured to supply a current in a direction indicated by an arrow "a" by utilizing a PN junction composed of the P+ layer and the N well, it actually functions as a substrate transistor (PNP-type transistor) due to production of a parasitic transistor, thereby supplying a leak current in a direction indicated by an arrow "b".

As shown in FIG. 4, in the power unit 3 where the floating type diode element D1A is used as the reverse-flow preventing diode D1, a large amount of leak current is supplied in a direction indicated by an arrow "c", thereby causing problems that a communication distance between the reader/writer and the composite IC card is shortened in the remote mode and that the battery life of the reader/writer is shortened in the contact mode.

It is conceivable to use a MOS transistor TR1 which has a diode characteristic (that is, a square characteristic) in place of the floating type diode element D1A as the reverse-flow preventing circuit as shown in FIG. 5. FIG. 6 shows a structure of the MOS transistor TR1 which has the diode characteristic. The MOS transistor TR1 is composed by joining an N well onto a P-type substrate adopted as ground, joining an N+ layer as a back gate electrode BG, a P+ layer as a source electrode S, and a P+ layer as a drain electrode D onto the N well, connecting the back gate electrode BG to the source electrode S, and connecting a gate electrode G and the drain electrode D.

This MOS transistor TR1 obtains the diode characteristic and a current flows in a direction indicated by an arrow h shown in FIG. 6 when a potential Vs of the back gate electrode BG is higher than a potential Vd of the drain electrode D. However, when the potential Vs of the back gate electrode BG is lower than the potential Vd of the drain electrode D, a parasitic diode is produced and a leak current flows in a direction indicated by an arrow "I" shown in FIG. 6.

Therefore, as shown in FIG. 7, the power unit 3 which uses MOS transistors TR1A and TR1B as the reverse-flow preventing circuit generates a direct voltage on an output side of the rectifier 10 and applies to the drain electrode D of the MOS transistor TR1B a voltage which is higher than that to the back gate electrode BG in the remote mode, thereby generating a parasitic diode. Accordingly, the MOS transistor TR1B allows a leak current to be supplied along a path from the P+ layer through the N well to the contact side power terminal VDD, whereby the reverse-flow preventing circuit cannot function as such.

The composite IC card 1 described above adopts a clock signal generation method which generates the master clock signal MCLK by selecting either the remote side clock signal RCLK in the remote mode or the contact side clock signal CCLK in the contact mode on the basis of the operation mode Mode determined by the operation mode determination circuit 15.

When the clock generator 16 is switched to select the remote side clock signal RCLK in the contact mode, for example, the composite IC card 1 which uses the clock signal generation method cannot operate the logic circuit 12 since the contact side clock signal CCLK is not supplied to the logic circuit 12. In this case, the composite IC card 1 cannot determine the operation mode by software operation processing which uses the logic circuit 12, so that it requires hardware such as the operation determination circuit 15 and the clock generator 16, thereby causing a problem in that a circuit scale may be enlarged.

SUMMARY OF THE INVENTION

In view of the foregoing, an object of this invention is to provide a power source unit and a card-like memory medium which can be configured compact while suppressing increase in electric power consumption.

The foregoing object and other objects of the invention have been achieved by the provision of a power source unit which supplies to following electronic circuits a source voltage comprised of a direct current generated on the basis of an alternating current supplied from outside via a first input terminal or a source voltage comprised of a direct current supplied from outside via a second input terminal, depending on a condition of use. The power source unit comprises a rectifier means for converting the alternating current supplied via the first input terminal into a direct current and a reverse-flow preventing means for preventing the direct current output from the rectifier means from being supplied reversely to the second input terminal, thereby preventing the direct current supplied via the second input terminal from being supplied reversely to the first input terminal on the basis of a characteristic of the rectifier means.

The characteristic of the rectifier means is utilized to prevent the direct current supplied via the second input terminal from being supplied reversely to the first input terminals and therefore, it is not necessary to conventionally dispose a separate means which prevents the direct current supplied via the second input terminals from being supplied reversely to the first input terminals, thereby making it possible to simplify a configuration of the power source unit and reduce useless current consumption.

Then nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Overall Configuration of Composite IC Card

Figure 8:
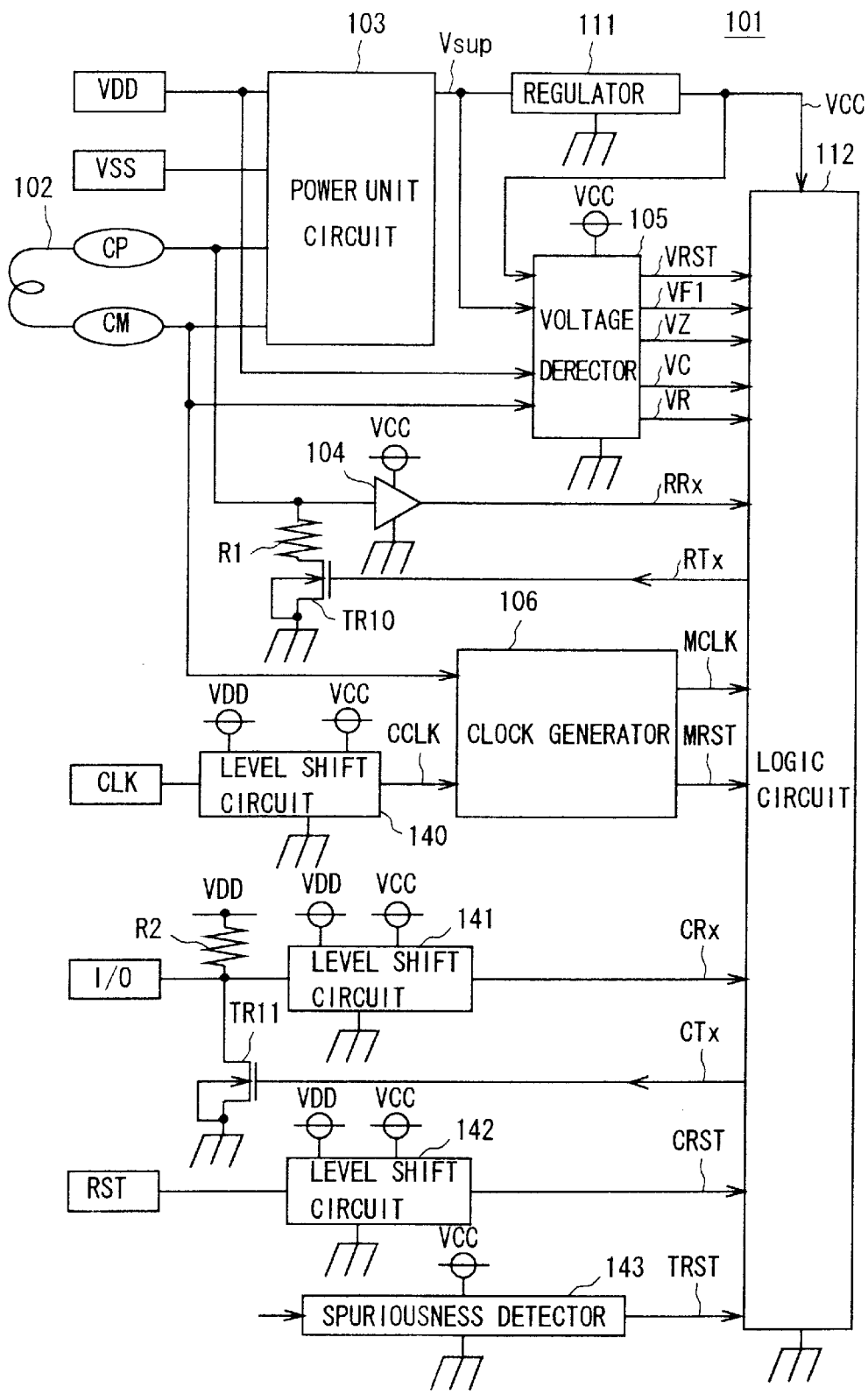
FIG. 8 is a block diagram showing an embodiment of a composite IC card according to the present invention.

In FIG. 8, a reference numeral 101 represents a composite IC card which is configured as a card-like memory medium as a whole. In a remote mode, the composite IC card 101 receives electromagnetic waves transmitted from a reader/writer (not shown) with an antenna coil 102, and sends out the energy (alternating current) of the electromagnetic waves to a power unit 103, a demodulator 104, a voltage detector 105 and a clock generator 106 via an antenna coil connection terminal CP or CM which are used as first input terminals. In a contact mode, on the other hand, the composite IC card 101 supplies to the power unit 103 a source voltage (direct current) which is sent from the reader/writer (not shown) via a contact side power terminal VDD or a contact side ground terminal VSS which are used as second input terminals.

In the remote mode, the power unit 103 converts the electromagnetic waves energy supplied via the antenna connection terminal CP or CM into a direct voltage and supplies the direct voltage as a service voltage $V_{sup}$ to a regulator 111 and the voltage detector 105. In the contact mode, on the other hand, the power unit 103 supplies a voltage sent from the contact side power terminal VDD or the contact side ground terminal VSS as a service voltage $V_{sup}$ to the regulator 111 and the voltage detector 105.

The regulator 111 is configured to keep the level of the service voltage $V_{sup}$ constant and sends it out to the voltage detector 105 and a logic circuit 112, thereby supplying a stable power to the voltage detector 105 and the logic circuit 112. The voltage detector 105 is configured to generate various kinds of flags to operate the logic circuit 112.

Figure 9:
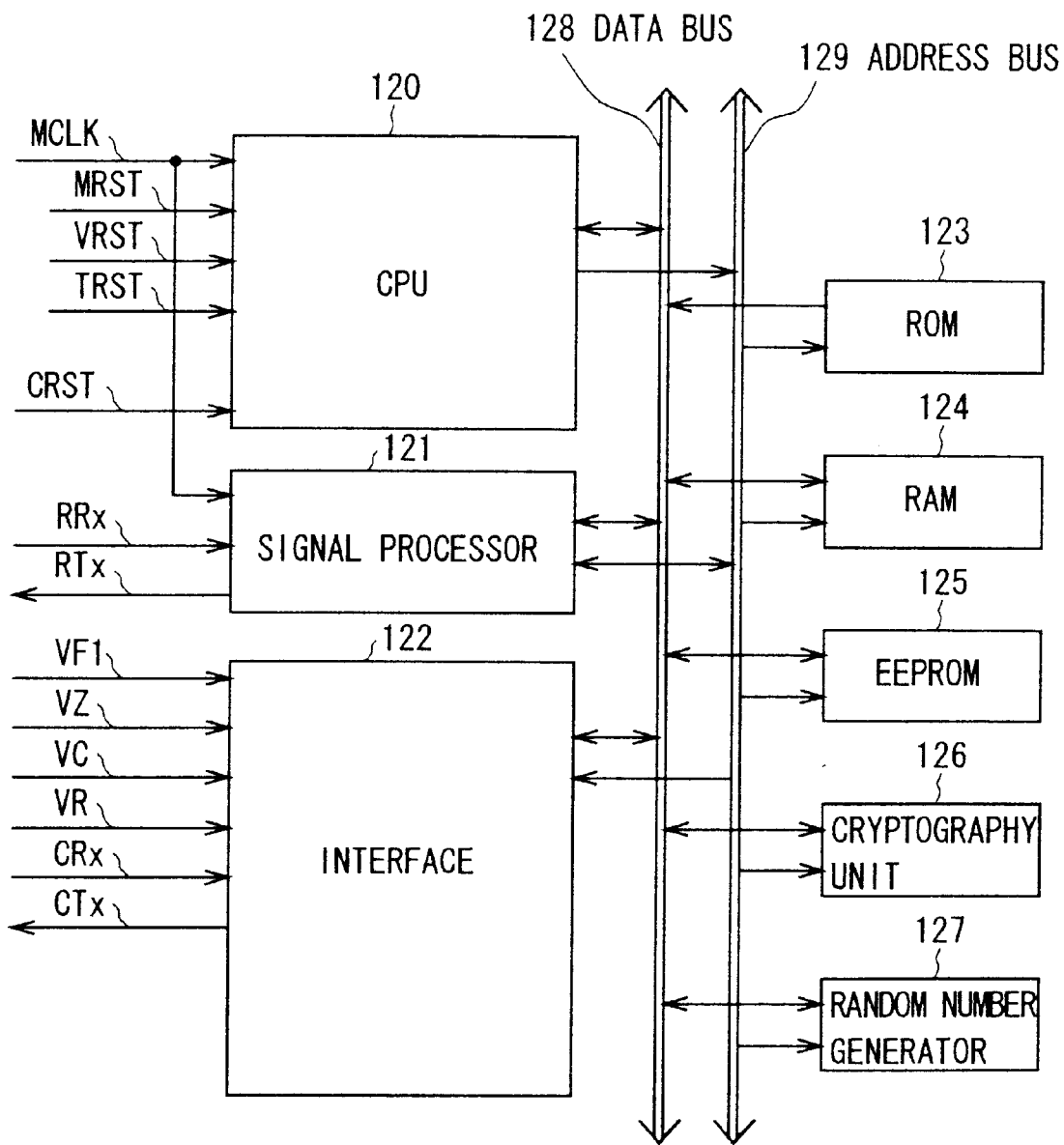
FIG. 9 is a block diagram showing a configuration of a logic circuit.

The logic circuit 112 is composed by connecting a central processor unit (CPU) 120, a signal processor 121, an interface 122, a read only memory (ROM) 123, a random access memory (RAM) 124, an electrically erasable programmable ROM (EEPROM) 125, a cryptography unit 126 and a random number generator 127 by a data bus 128 and an address bus 129 as shown in FIG. 9.

The voltage detector 105 converts the level of the supplied service voltage $V_{sup}$ into a voltage level corresponding to an internal source voltage VCC, and when a level of a converted source voltage VCC is lower than that of a voltage required to operate the logic circuit 112, the voltage detector 105 sends out a reset signal VRST having a logical level "H" to the logic circuit 112. The logic circuit 112 inputs the reset signal VRST having the logical level "H" into the CPU 120 (FIG. 9), whereby the CPU 120 stops the operation of each circuit block.

On the other hand, when the source voltage VCC has higher than the voltage required to operate the logic circuit 112, the voltage detector 105 sends out a source voltage monitor flag signal VF1 having the logical level "H" to the interface 122 of the logic circuit 122 (FIG. 9). At this stage, the CPU 120 detects the source voltage monitor flag signal VF1 having the logical level "H" supplied to the interface 122 and operates each circuit block.

Further, when the service voltage $V_{sup}$ has a level which is higher than a predetermined threshold value, the voltage detector 105 sends out an input voltage detection flag VZ having the logical level "H" to the interface 122 of the logic circuit 112. At this stage, the CPU 120 detects the input voltage detection flag VZ having the logical level "H" supplied to the interface 122 and controls the operation of each circuit block.

When the voltage detector 105 detects the source voltage supplied via the antenna connection terminal CM, it generates a remote side source voltage flag VR having the logical level "H" and sends it out to the interface 122 of the logic circuit 112. And when the voltage detector 105 detects the source voltage supplied via the contact side power terminal VDD, it generates a contact side source voltage flag VC having the logical level "H" and sends it out to the interface 122 of the logic circuit 112. At this stage, the CPU 120 is configured to detect the remote side source voltage flag VR supplied to the interface 122 or the contact side source voltage flag VC, thereby determining an operation mode.

The demodulator 104 generates remote side input data $RR_x$ by amplifying and binarizing the electromagnetic waves received with the antenna coil 102, and sends it out to the signal processor 121 of the logic circuit 112 (FIG. 9). The signal processor 121 generates remote side output data $RT_X$ by performing predetermined data processing on the remote side input data $RR_x$. The signal processor 121 operates a MOS transistor TR10 by giving the remote side output data $RT_X$ to the MOS transistor TR10 and sends out a current generated at this time to the antenna coil 102 via a resistor R1 and the antenna connection terminal CP, and then the antenna coil 102 radiates electromagnetic waves toward the reader/writer.

In the contact mode, the composite IC card 101 inputs a clock signal input from the contact side clock input terminal CLK into a level shift circuit 140. Since the source voltage VDD supplied from outside is higher than the internal source voltage VCC, the level shift circuit 140 converts a signal level of the input clock signal into a signal level corresponding to the internal source voltage VCC by using an internal buffer and sends out the obtained contact side clock signal CCLK to the clock generator 106.

The clock generator 106 generates a remote side clock signal RCLK on the basis of the electromagnetic waves received with the antenna coil 102, generates a master clock signal MCLK on the basis of the remote side clock signal RCLK and contact side clock signal CCLK and sends it out to the CPU 120 and the signal processor 121 of the logic circuit 112 and moreover, generates a master reset signal MRST indicating whether or not the master clock signal MCLK has an error and sends it out to the CPU 120 of the logic circuit 112. On the basis of the master reset signal MRST, the CPU 120 judges whether or not the master clock signal MCLK is correct and executes an operation based on the master clock signal MCLK in accordance with the judgment.

In the contact mode, the composite IC card 101 inputs data sent from the reader/writer to a level shift circuit 141 via the contact side data input/output terminal I/O. The level shift circuit 141 converts a signal level of the supplied data into a signal level corresponding to the internal source voltage VCC and sends out the obtained contact side input data $CR_x$ a to the interface 122 of the logic circuit 112.

The CPU 120 detects the contact side input data $CR_x$ supplied to the interface 122, generates contact side output data $CT_x$ as a response signal by performing predetermined data processing on the contact side input data $CR_x$ as predetermined and sends it out to the MOS transistor TR11. By the way, a connection middle point between the contact side data input/output terminal I/O and the level shift circuit 141 is connected to ground via the MOS transistor TR11 and to the source voltage VDD via a resistor R2. Accordingly, the MOS transistor TR11 amplifies the contact side output data $CT_x$ to a predetermined signal level and then sends it out to the reader/writer via the contact side data input/output terminal I/O.

Furthermore, the composite IC card 101 inputs a reset signal sent from the reader/writer into a level shift circuit 142 via a contact side reset terminal RST. The level shift circuit 142 generates a contact side reset signal CRST by converting a signal level of the reset signal into a signal level corresponding to the internal source voltage VCC and supplies it to the CPU 120 of the logic circuit 112. The contact side reset signal CRST interrupts the CPU 120 which is then shifted to the contact mode.

Furthermore, a spuriousness detector 143 which is adopted to prevent spuriousness from outside always checks voltages and frequencies supplied from outside, and if it detects the voltage or frequency exceeding a predetermined threshold value, it generates a tamper reset signal TRST and sends it out to the CPU 120 of the logic circuit 112. The CPU 120 is configured to stop an operation of the logic circuit 112 on the basis of the tamper reset signal TRST.

Note that, the CPU 120 and the signal processor 121 are configured to read out program data stored in the ROM 123 as occasion demands and operate on the basis of the read program data. Further, the CPU 120 and the signal processor 121 are configured to access the RAM 124 as occasion demands to store data temporarily in the RAM 124. Furthermore, the CPU 120 and the signal processor 121 are configured to access the EEPROM 125 as occasion demands to write data into the EEPROM 125 or read written data from the EEPROM 125 and execute an operation in accordance with the read data. The cryptography unit 126 is used to decipher received data or encipher data to be transmitted. The random number generator 127 generates random numbers which are used for cryptography processing.

(2) Configuration of Power Unit

A reverse-flow preventing circuit will be described in two cases: one is the case where a reverse-flow preventing circuit is interposed between a contact side power terminal and an output side of a rectifier, and the other is the case where a reverse-flow preventing circuit is interposed between ground and a contact side ground terminal.

(2-1) Configuration of Power Unit in which Reverse-flow Preventing Circuit is Connected to Contact Side Power Terminal.

First, a fundamental configuration of a power unit 200A in which a reverse-flow preventing circuit is interposed between a contact side power terminal VDD and an output side of a rectifier 201 will be described with reference to FIG. 10. In the power unit 200A, the contact side power terminal VDD is connected to the output side of the rectifier 201 via a switch SW1 to supply a service voltage $V_{sup}$ to following circuits. Further, the contact side power terminal VDD is connected via a switch SW2 to a contact side ground terminal VSS which is connected to ground. An input side of the rectifier 201 is connected to antenna coil connection terminals CP and CM, and its output side is configured to supply the service voltage $V_{sup}$ to the following circuits.

A control circuit 202 controls opening/closing of the switches SW1 and SW2 on the basis of potentials on an input terminal side and an output side respectively of the switch SW1. Concretely, the control circuit 202 makes the switches SW1 and SW2 conductive and nonconductive respectively when a voltage on the input terminal side of the switch SW1 is higher than that on the output terminal side, whereas the control circuit 202 makes the switches SW1 and SW2 nonconductive and conductive respectively when the voltage on the input terminal side of the switch SW1 is low lower than that on the output terminal side.

In the contact mode, the power unit 200A therefore supplies a voltage to the following circuits via the switch SW1 when the voltage is applied to the input terminal side of the switch SW1. In the remote mode, the power unit 200A prevents a voltage from leaking to the contact side power terminal VDD when the voltage from the rectifier 201 is applied to the output terminal side of the switch SW1 and allows a noise voltage to flow to ground even when a noise voltage, for example, is applied temporarily to the contact side power terminal VDD.

As described above, when the noise voltage is applied to the contact side power terminal VDD in the remote mode, the power unit 200A allows a current corresponding to the noise voltage to flow to ground, thereby preventing a voltage on the input terminal side of the switch SW1 from being higher than that on the output terminal side. Accordingly, the control circuit 202 is capable of accurately detecting the voltage on the input terminal side of the switch SW1, thereby preventing the switches SW1 and SW2 from operating erroneously.

A rectifier generally has properties that it outputs to the output side a direct voltage corresponding to an effective value of a supplied voltage only when the effective value of the voltage supplied to an input side is larger than a voltage on an output side, and that it is set in an insulated condition when the effective value of the voltage supplied on the input side is smaller than the voltage on the output side. Therefore, in the case where no voltage is applied to the input side of the rectifier 201 and a voltage is applied to the output side in the contact mode, a voltage on the input side is lower than that on the output side in the power unit 200A and the rectifier 201 is set in an insulated condition. In this case, the power unit 200A prevents a leak current from flowing from the contact side power terminal VDD to the antenna coil 102 (FIG. 8), so it is unnecessary to dispose a reverse-flow preventing circuit on the output side of the rectifier 201.

Figure 11:
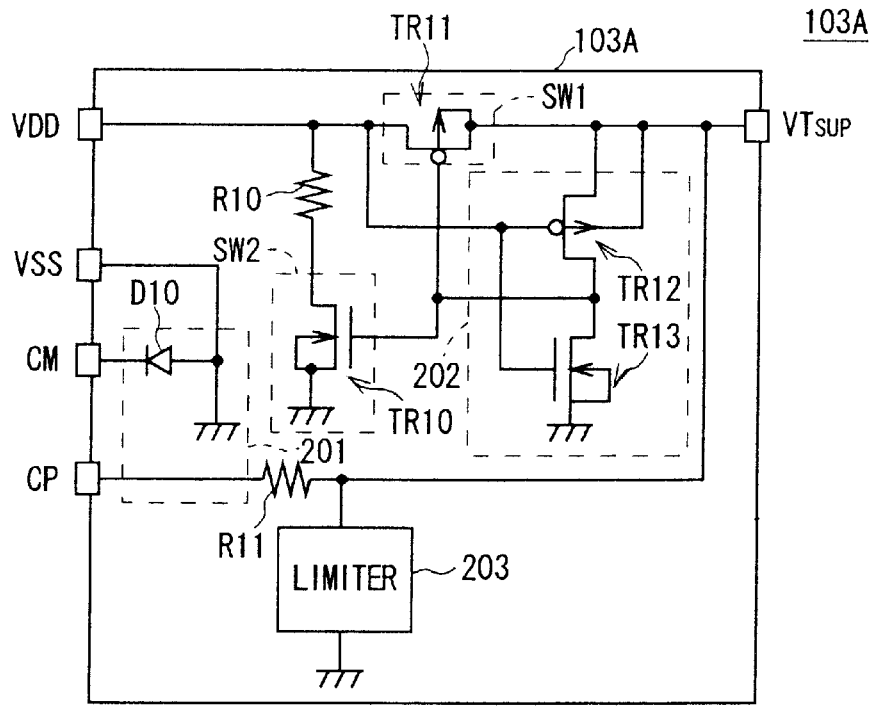
FIG. 11 is a connection diagram of the power unit to be mounted on a composite IC card.

FIG. 11 shows a configuration of a power unit 103A which is actually mounted on the composite IC card 101 (FIG. 8). The contact side power terminal VDD is connected to ground via a resistor R10 and the switch SW2 composed of a MOS transistor TR10 which are connected in series, and to an output voltage terminal $VT_{sup}$ via the switch SW1 composed of a MOS transistor TR11.

A middle point of connection between the switch SW1 and the output voltage terminal $V_{sup}$ is connected to ground via MOS transistors TR12 and TR13 which are connected in series. Furthermore, a drain of the MOS transistor TR11 is connected to gates of the MOS transistors TR12 and TR13 which compose the control circuit 202. Furthermore, gates of the MOS transistors TR10 and TR11 are connected to a middle point of connection between the MOS transistors TR12 and TR13. In contrast, the contact side ground terminal VSS is connected to ground.

On the other hand, the antenna coil connection terminal CM is connected to ground via a diode element D10 which composes the rectifier 201. In contrast, the antenna coil connection terminal CP is connected to an overvoltage preventing limiter 202 and the output voltage terminal $VT_{sup}$ via a resistor R11.

Accordingly, in the contact mode, the power unit 103A turns on the switch SW1 and turns off the switch SW2 when a voltage is applied to the contact side power terminal VDD. On the other hand, in the remote mode, it turns off the switch SW1 and turns on the switch SW2 when a voltage is applied to the antenna coil connection terminals CM and CP.

Figure 10:
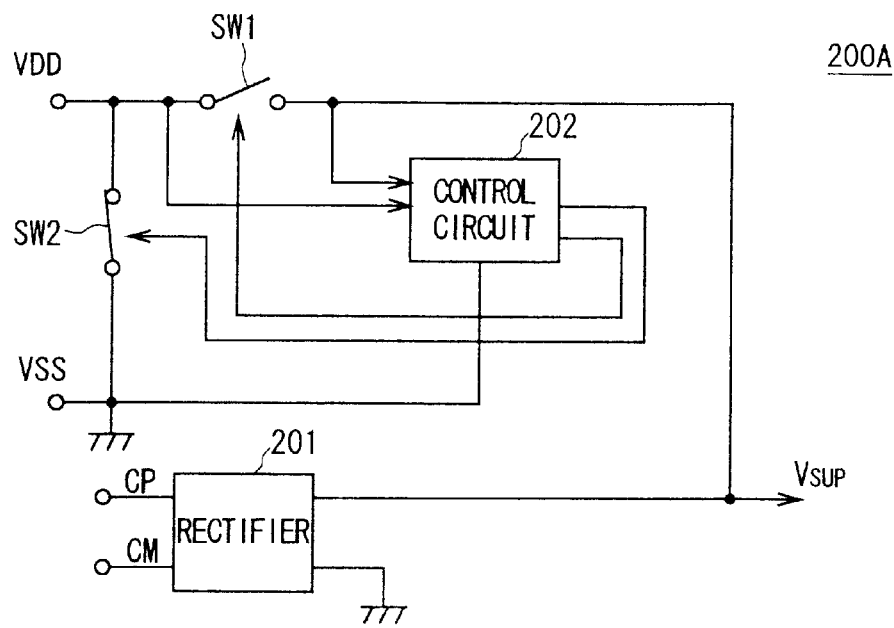
FIG. 10 is a connection diagram showing a fundamental configuration of the power unit.
Figure 12:
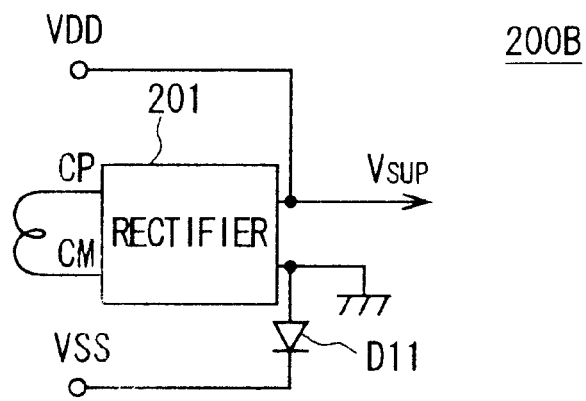
FIG. 12 is a connection diagram showing a fundamental configuration of the power unit.

(2-2) Configuration of a power unit in which a reverse-flow preventing circuit is connected to a contact side ground terminal A configuration of a power unit 200B in which a diode element D11 A is interposed between ground and the contact side ground terminal VSS is shown in FIG. 12, wherein members corresponding to those shown in FIG. 10 are represented by the same reference numerals. In this case, the contact side power terminal VDD is connected directly to the output side of a rectifier 201.

In the power unit 200B in the contact mode, When the reader/writer applies a voltage between the contact side power terminal VDD and the contact side ground terminal VSS, a current flows along a path from the contact side power terminal VDD through the following electronic circuits, ground of the electronic circuit and the diode element D11 to the contact side ground terminal VSS, whereby the internal members of the composite IC card 101 operate correctly.

On the other hand, in the power unit 200B in the remote mode, a direct voltage output from the rectifier 201 is applied directly to the contact side power terminal VDD, but the contact side power terminal VDD and the contact side ground terminal VSS are set in a nonconductive condition and have no influence on the operations of the composite IC card 101. Even when the contact side ground terminal VSS is shorted with the contact side power terminal VDD, the diode element D11 prevents a current from flowing.

Figure 13:
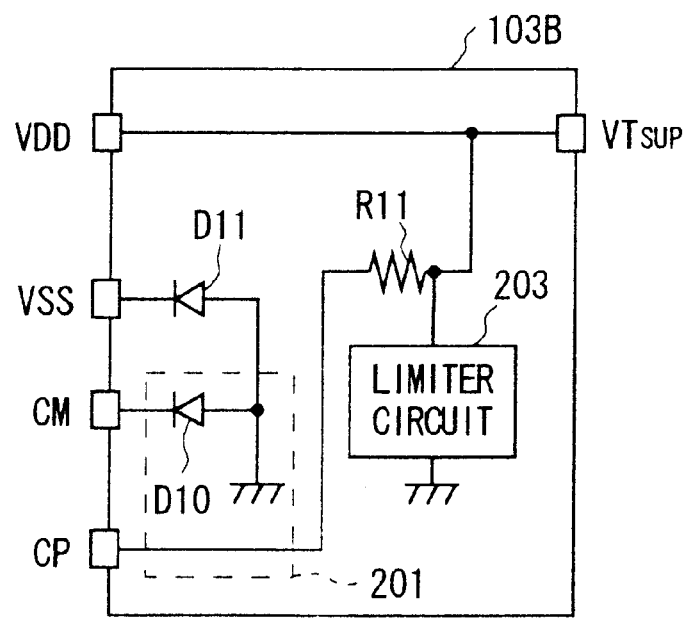
FIG. 13 is a connection diagram showing the power unit to be mounted on the composite IC card.
Figure 14:
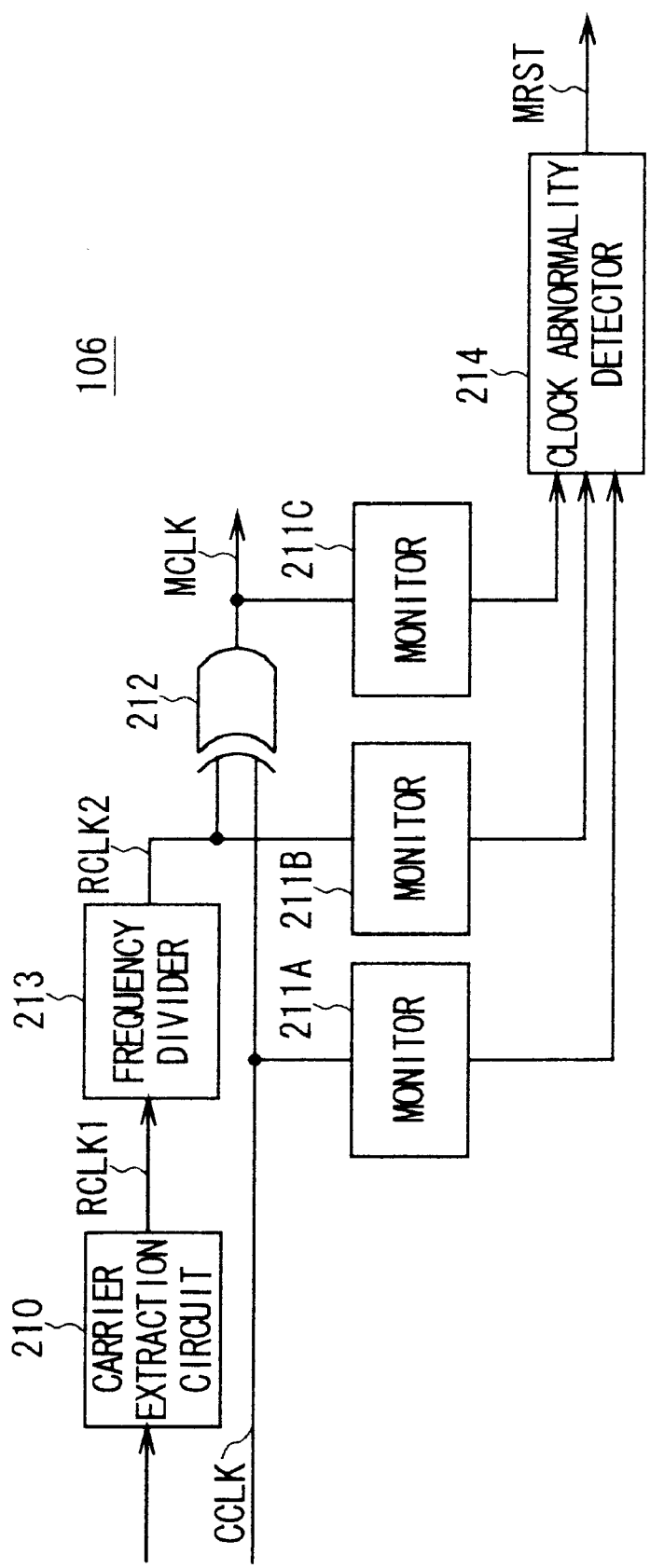
FIG. 14 is a block diagram showing a configuration of a clock generator.

FIG. 13 shows a configuration of a power unit 103B which is configured on the basis of the fundamental configuration of the power unit 200B described above and which is actually mounted on the composite IC card 101 (FIG. 8). First, the contact side power terminal VDD is connected directly to the output voltage terminal $VT_{sup}$, whereas the contact side ground terminal VSS is connected to ground via the diode element D11.

On the other hand, the antenna coil connection terminal CM is connected to ground via the diode element D10 which composes the rectifier 201. In contrast, the antenna coil connection terminal CP is configured to connect the resistor R11 to ground via the limiter 202 and to the output voltage terminal $VT_{sup}$.

As described above, in the contact mode, when a voltage is applied to the contact side power terminal VDD, the power unit 103B supplies the applied voltage to the following circuits via the output voltage terminal $VT_{sup}$ while preventing the voltage from leaking into the antenna coil 102 (FIG. 8) with the rectifier 201. On the other hand, in the remote mode, when a voltage is applied to the antenna coil connection terminals CM and CP, the power unit 103B allows the voltage to apply to the contact side power terminal VDD, but the contact side ground terminal VSS is set in the nonconductive condition at this stage and has no influence on operations of the composite IC card 101 and the diode element D11 prevents a reverse flow even if the contact side ground terminal VSS is shortened with the contact side power terminal VDD.

(3) Configuration of Clock Generator

The clock generator 106 inputs the electromagnetic waves received by the antenna coil 102 (FIG. 8) into a carrier extraction circuit 210, and inputs the contact side clock signal CCLK supplied from the level shift circuit 140 into a monitor 211A and an exclusive logical, sum circuit 212. On the basis of the electromagnetic waves, the carrier extraction circuit 210 generates a remote side clock signal RCLK1 and sends it out to a frequency divider 213. The frequency divider 213 divides the remote side clock signal RCLK1 into two, and sends out a remote side clock signal RCLK2 thus obtained to the exclusive logical sum circuit 212 and a monitor 211B.

The exclusive logical sum circuit 212 calculates an exclusive logical sum of the remote side clock signal RCLK2 and the contact side clock signal CCLK to synthesize these signals, sends out a master clock signal MCLK thus obtained to a following circuit and also to a monitor 211C.

At this stage, the remote side clock signal RCLK1 is configured to be fixed to a logical level "H" or "L" when the composite IC card 101 does not receive electromagnetic waves with the antenna coil 102. Similarly, the contact side clock signal CCLK is configured to be fixed at the logical level "H" or "L" when the clock signal is not input from the contact side clock terminal CLK.

Figure 1:
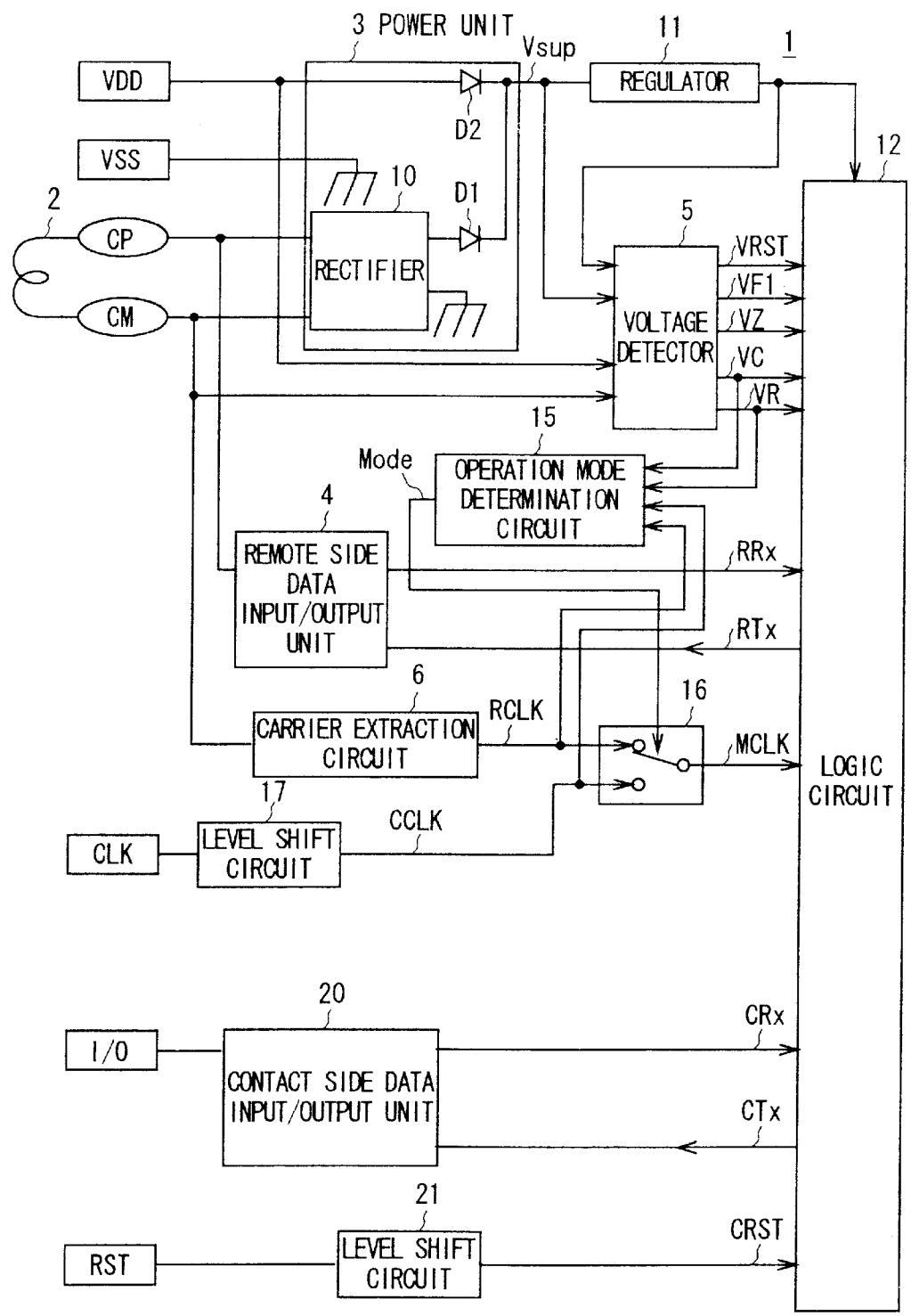
FIG. 1 is a block diagram showing a configuration of a conventional composite IC card.
Figure 2:
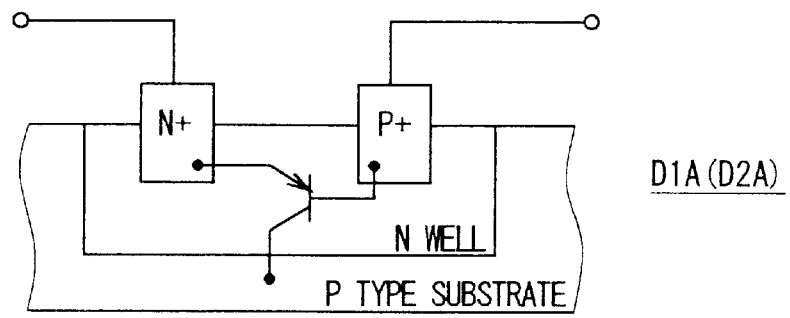
FIG. 2 is a schematic diagram showing a structure of a floating type diode element.
Figure 3:
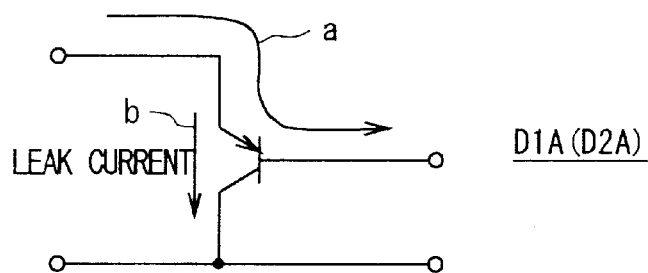
FIG. 3 is a connection diagram showing a reverse-flow preventing circuit using the floating type diode element.
Figure 4:
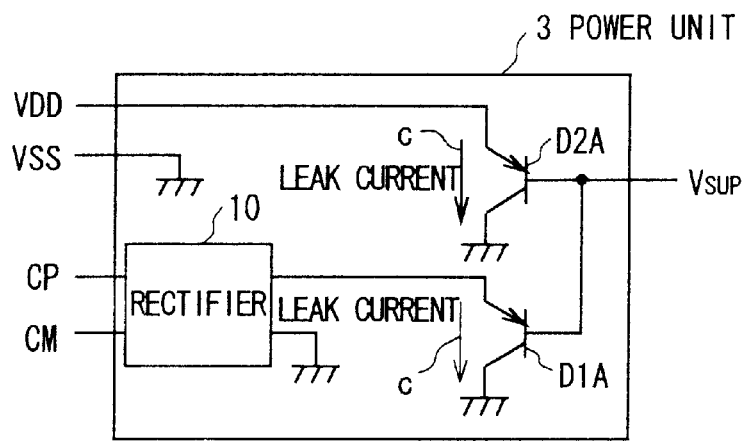
FIG. 4 is a connection diagram showing a configuration of a conventional power unit.
Figure 5:
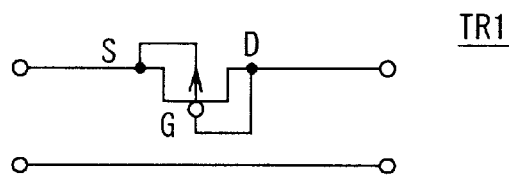
FIG. 5 is a connection diagram showing the reverse-flow preventing circuit using a MOS transistor.
Figure 6:
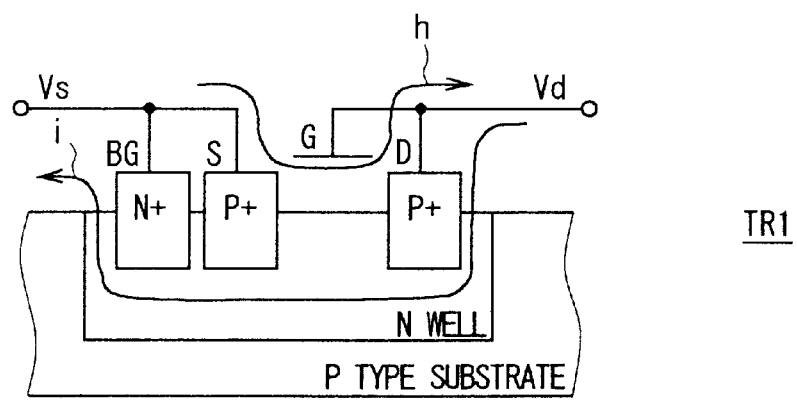
FIG. 6 is a schematic diagram visualizing a principle of producing a leak current.
Figure 7:
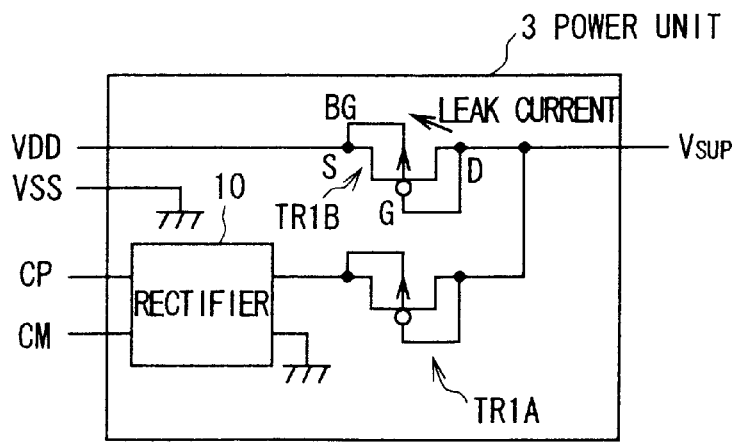
FIG. 7 is a connection diagram showing a configuration of the conventional power unit.

Accordingly, the exclusive logical sum circuit 212 is configured to output the remote side clock signal RCLK2 as the master clock signal MCLK with no modification in the remote mode and on the other hand, it outputs the contact side clock signal CCLK to the outside as the master clock signal MCLK with no modification in the contact mode. Accordingly, the composite IC card 101 does not require disposing a selector switch such as the clock generator 16 unlike the composite IC card 1 shown in FIG. 1, thereby making it possible to simplify a hardware configuration.

Furthermore, the clock generator 106 monitors the contact side clock signal CCLK with the monitor 211A, monitors the remote side clock signal RCLK2 with the monitor 211B, monitors the master clock signal MCLK with the monitor 211C and sends out their monitor results to a clock abnormality detector 214.

On the basis of these monitor results, the clock abnormality detector 214 judges whether or not either the contact side clock signal CCLK or the remote side clock signal RCLK2 is the same as the master clock signal MCLK, except a time delay. When the clock abnormality detector 214 judges either of the clock signals is not the same, it generates a master clock reset signal MRST having the logical level "H" and sends it out to the CPU 120 of the logic circuit 112 to stop an operation of the CPU 120 or when the clock abnormality detector 214 judges that one clock signal is the same, it generates a master clock reset signal MRST having the logical level "L" and sends it out to the CPU 120 of the logic circuit 112 to operate the CPU 120, thereby preventing an erroneous operation.

(4) Operations and Effects

The power unit 103 which has the configuration described above can have a simple configuration and reduces a leak current since it prevents the direct current supplied via the contact side power terminal VDD from being supplied reversely to the antenna coil connection terminal CP by utilizing the characteristic of the rectifier 201 and does not require disposing a separate circuit to prevent the direct current supplied via the contact side power terminal VDD from being supplied reversely to the antenna coil connection terminal CP unlike the conventional power unit 3. The reduction of the leak current produced in the power unit 103 described above makes it possible to integrate circuits of the composite IC card 101 using the CMOS process which enables to integrate circuits at a high degree and miniaturize the composite IC card.

In the power unit 103A, a noise voltage flows to ground even when a noise voltage is applied to the contact side power terminal VDD since the switch SW1 is connected between the output side of the rectifier 201 and the contact side power terminal VDD, the switch SW2 is connected between the contact side power terminal VDD and ground, voltages on the input side and the output side of the switch SW1 are detected with the control circuit 202, and the switch SW1 is set in the nonconductive state and the switch SW2 is set in the conductive state in the remote mode by controlling the opening/closing of the switches SW1 and SW2 are controlled on the basis of detection results. Accordingly, the control circuit 202 is capable of accurately detecting the voltages on the input side and the output side of the switch SW1, and preventing the switches SW1 and SW2 from operating erroneously.

The power unit which has the configuration described above which prevents the direct current supplied via the contact side power terminal VDD from being supplied reversely to the antenna coil connection terminal CP with the rectifier 201 does not require disposing a separate circuit to prevent the reverse flow unlike the conventional power unit 3, and makes it possible to simplify a configuration and to reduce a leak current, thereby miniaturizing the composite IC card 101 while suppressing increase in power consumption.

(5) Other Embodiments

Figure 15:
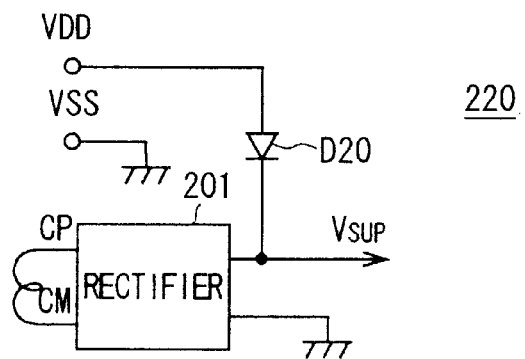
FIGS. 15 to 17 are connection diagrams showing a configuration of the power unit in other embodiments.

Note that, in the aforementioned embodiment, the switch SW1 is interposed between the contact side power terminal VDD and the rectifier 201 as shown in FIG. 10. However, the present invention is not limited thereto, and a power unit 220 can be composed by interposing a diode element D20 between the contact side power terminal VDD and the rectifier 201 as shown in FIG. 15, wherein members corresponding to those shown in FIG. 10 are represented by the same reference numerals.

Figure 16:
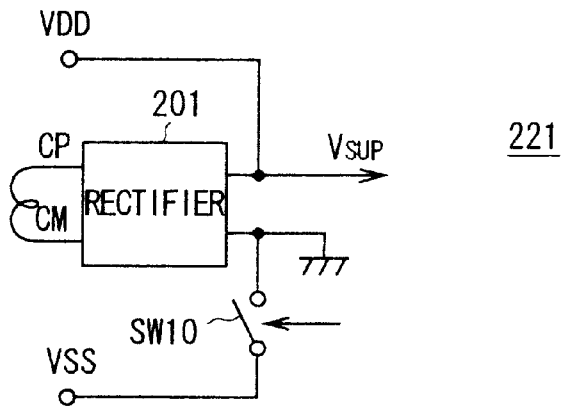

Further, in the aforementioned embodiment, the diode element D11 is interposed between ground and the contact side ground terminal VSS as shown in FIG. 12. However, the present invention is not limited thereto, and a power unit 221 can be composed by interposing a switch SW10 between ground and the contact side ground terminal VSS as shown in FIG. 16, wherein members corresponding to those shown in FIG. 12 are represented by the same reference numerals.

Figure 17:
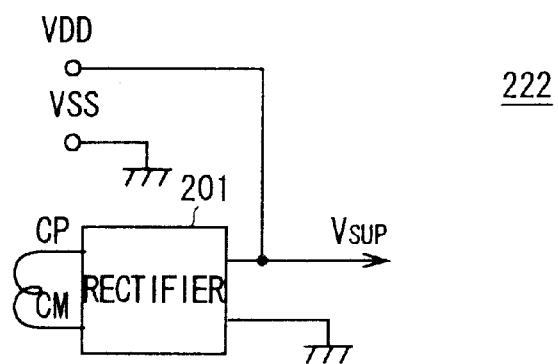
Figure 18A:
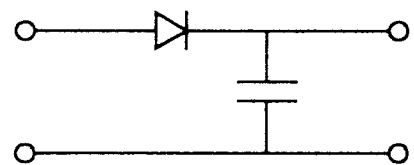
FIGS. 18A to 18E are connection diagrams showing a configuration of a rectifier in another embodiment.
Figure 18B:
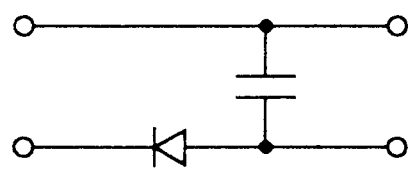
Figure 18C:
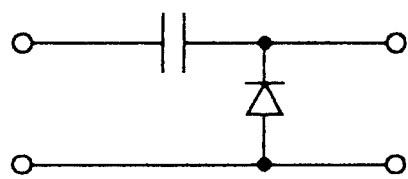
Figure 18D:
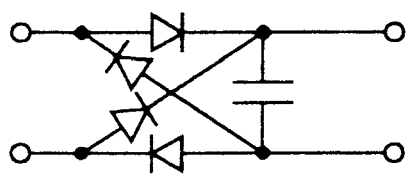
Figure 18E:
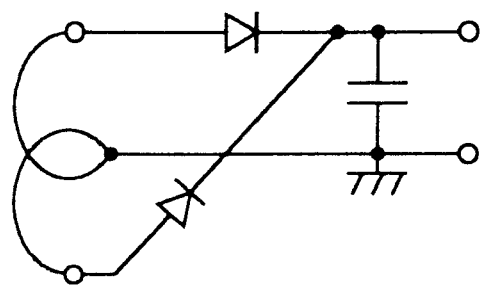

Further, in the aforementioned embodiment, the reverse-flow preventing circuit is interposed between the contact side power terminal VDD and the rectifier 201 or between ground and the contact side ground terminal VSS. However, the present invention is not limited thereto, and a power unit 222 can be composed by connecting the contact side power terminal VDD directly to the rectifier 201 and connecting ground directly to the contact side ground terminal VSS as shown in FIG. 17, wherein members corresponding to those shown in FIGS. 10 and 12 are represented by the same reference numerals. In this case also, in the contact mode, the rectifier 201 is capable of preventing a current from being supplied reversely from the contact side power terminal VDD to the antenna coil connection terminal CP.

Further, in the aforementioned embodiment, the diode element D10 is used as the rectifier 201. However, the present invention is not limited thereto, and a rectifier can be composed by combining one or more diode elements with a capacitor, for example, as shown in FIGS. 18A through 18E.

Furthermore, in the aforementioned embodiment, the present invention is applied to a composite IC card 101 for a security system. However, the present invention is not limited thereto and is widely applicable to composite IC cards to be used in other various kinds of systems, for example, composite IC cards to be used for railroad ticket examining machines and electronic money systems.

As described above, the present invention which prevents a direct current supplied via a second input terminal from being supplied reversely to a first input terminal with a rectifier means makes it unnecessary to dispose conventional means which prevents the direct current supplied via the second input terminal from being supplied reversely to the first input terminal to eliminate the conventional necessity, permits simplifying a configuration of a composite IC card and reducing useless power consumption, thereby making it possible to miniaturize the composite IC card while suppressing increase in power consumption.

While there has been described in connection with the preferred embodiments of the invention, it will be obvious to those skilled in the art that various changes and modifications may be aimed, therefore, to cover in the appended claims all such changes and modifications as fall within the true spirit and of the invention.

What is claimed is:

1. A power source unit for supplying a source voltage which consists of a direct current generated on the basis of an alternating current supplied from outside via a first input terminal or a source voltage which consists of a direct current supplied from outside via a second input terminal to following electronic circuits dependently on a condition of use, said power source unit comprising:

rectifier means for converting said alternating current supplied via said first input terminal into a direct current; and reverse-flow preventing means for preventing said direct current output from said rectifier means from flowing reversely to said second input terminal, wherein said direct current supplied via said second input terminal is prevented from flowing reversely to said first input terminal on the basis of characteristics of said rectifier means.

2. The power source unit according to claim 1, wherein said reverse-flow preventing means is connected between an output side of said rectifier means and said second input terminal.

3. The power source unit according to claim 2, wherein said reverse-flow preventing means comprises a diode element.

4. The power source unit according to claim 2, wherein said reverse-flow preventing means comprises a first switch element.

5. The power source unit according to claim 4, further comprising:

a second switch element which is connected between said second input terminal and ground; and control means for detecting voltages on an input side and an output side of said first switch element, and for controlling opening/closing of said first and second switch elements on the basis of the detection results.

6. The power source unit according to claim 1, wherein said reverse-flow preventing means is connected between said second input terminal and ground.

7. The power source unit according to claim 6, wherein said reverse-flow preventing means comprises a diode element or a switch element.

8. A card-like memory medium for exchanging data with external appliances by a source voltage from a power source unit which supplies a source voltage consisting of a direct current generated on the basis of an alternating current supplied from outside via a first input terminal or a source voltage consisting of a direct current supplied from outside via a second input terminal to following electronic circuits dependently on a condition of use, wherein:

said power source unit comprises:

rectifier means for converting said alternating current supplied via said first input terminal into a direct current; and reverse-flow preventing means for preventing said direct current output from said rectifier means from flowing reversely to said second input terminal; and said direct current supplied via said second input terminal is prevented from flowing reversely to said first input terminal on the basis of a characteristic of said rectifier means.

9. The card-like memory medium according to claim 8, wherein said reverse-flow preventing means is connected between an output side of said rectifier means and said second input terminal.

10. The card-like memory medium according to claim 9, wherein said reverse-flow preventing means comprises a diode element.

11. The card-like memory medium according to claim 9, wherein said reverse-flow preventing means comprises a first switch element.

12. The card-like memory medium according to claim 11, wherein:

said power source unit comprises:

a second switch element which is connected between said second input terminal and ground; and control means for detecting voltages on an input side and an output side of said first switch element, and for controlling opening/closing of said first and second switch elements on the basis of the detection results.

13. The card-like memory medium according to claim 8, wherein said reverse-flow preventing means is connected between said second input terminal and ground.

14. The card-like memory medium according to claim 13, wherein said reverse-flow preventing means comprises a diode element or a switch element.

15. The card-like memory medium according to claim 8, comprising clock generation means for synthesizing a first clock signal generated on the basis of said alternating current with a second clock signal fixed at a predetermined logical level when said alternating current is supplied from outside via said first input terminal or for synthesizing a first clock signal fixed at a predetermined logical level with a second clock signal supplied from outside when the direct current is supplied from outside via said second input terminal, thereby generating a third clock signal for operating following electronic circuits.

* * * * *